Jan. 3, 1967   C. SALVADOR   3,295,816
INDICATOR TAPE HOLDER
Filed Sept. 16, 1965
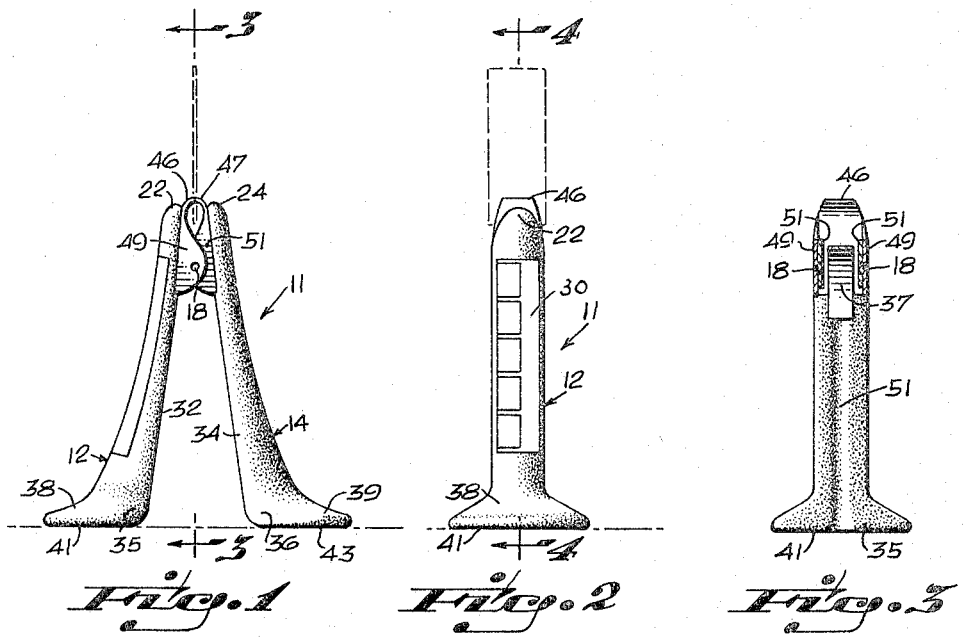
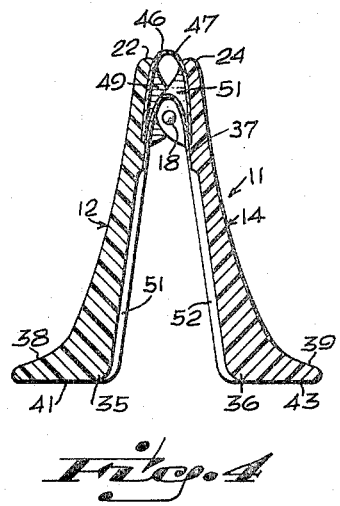
INVENTOR.
CARMELO SALVADOR
BY John Cyril Malloy
ATTORNEY.

United States Patent Office 3,295,816
Patented Jan. 3, 1967

3,295,816
INDICATOR TAPE HOLDER
Carmelo Salvador, 2926 Royal Palm Ave.,
Miami Beach, Fla.
Filed Sept. 16, 1965, Ser. No. 487,839
3 Claims. (Cl. 248—473)

This invention relates to an indicator tape holder and, more particularly, to an indicator tape holder of the type described hereinafter and having feet arranged so that the holder is adapted to be placed on a surface while holding a strip of indicator tape.

As is perhaps well known, those persons having diabetes have a certain sugar content in their urine. It is necessary to determine the degree of sugar content in the urine from time to time and for this purpose a sugar responsive indicator tape is utilized. In use the indicator tape is dipped into a specimen and the change in color which results from the urine coming in contact with the indicator tape is an indication of the condition of the patient, i.e., the amount of sugar content in the patient's urine. Individuals may purchase strips of indicator tape for their own use in drug stores; however, because the idea of dipping a short strip of tape in urine by the hands is somewhat distasteful to nurses in the hospital, different means are utilized which are more expensive than the tape test. The instant invention provides a device to hold a tape strip, instead of in the hands of a nurse, so that the tape test method may be utilized to test the sugar content specimens. The tape holder device comprises two pivotally connected members adapted to move a pair of hands into opposing relation to hold the strip therebetween and, in addition the members of the holder includes feet so that the device may be placed upon a table until such time as it is to be interpreted.

Accordingly, it is an object of this invention to provide an indicator tapeholder comprising a first and a second pivotally connected member normally urged into a position with respect to the pivot axis so that the ends of the members are adapted to grasp and hold a specimen to be tested therebetween.

It is another object of this invention to provide a tape holder of the type set forth in the foregoing paragraph and having a standard indicia pattern for comparison with a test tape.

It is another object of this invention to provide an indicator tape holder having guide means thereon to deflect any droplets of urine from the members which hold the tape holder.

It is another object of this invention to provide an indicator tape holder which is simple in construction, relatively inexpensive to manufacture and is otherwise well adapted for the purposes for which it is intended.

In accordance with these and other objects which will become apparent hereinafter, the instant invention will now be described with reference to the accompanying drawing illustrating the preferred embodiment thereof.

FIGURE 1 is a side elevation view of the instant indicator tape holder and illustrating a piece of tape in phantom lines;

FIGURE 2 is a side elevation view of the holder of FIGURE 1;

FIGURE 3 is a view similar to that of FIGURE 2 taken along the plane of the line 3—3 of FIGURE 1 and looking in the direction of the arrows; and FIGURE 4 is a view in cross section taken along the plane indicated by the line 4—4 of FIGURE 2 and looking in the direction of the arrows.

Referring to the drawings and particularly to FIGURE 1, it will be seen that the holder 11 comprises a first and second jaw members 12 and 14, respectively, which are pivotally connected as at 18 so that the members may be moved relative to one another to bring the distal ends 22 and 24 of the shorter portion of each member into the confronting abutting relation shown with the longer stems 32 and 34, respectively, being of such a length that the lower ends 35 and 36 are substantially spaced apart. Spring means 37 are provided to normally urge the members into the position shown in FIGURE 1 and, for the purpose of standing the holder on a surface, the base ends of 38 and 39 of the holder member are provided with feet 41 and 43, the bottom surfaces of which define a support plane when the device is in the attitude shown in FIGURE 1. The preferred length of the members is of the order of 2½ inches with the length of the stems being about 1⅞ inches so that the inner edges of the support plane are about ¾ of an inch apart when in the attitude shown in FIGURE 1.

As can be seen in the drawings, the members include gripper means or clasp elements 46 and 47 on the confronting surfaces of the ends 22 and 24 to clasp together and hold a piece of indicator tape therebetween. Further, the gripper means may also be provided with mutually intercooperating flanges 49 and 51 along the length of the shorter portion of each member which are adapted to mate and pivotally connect together with the axis of the pivot being about ¼ inch out from the confronting surface of each of the members. As clearly depicted upon FIGURE 1, the upper ends of these clasp elements are turned upwardly and inwardly toward each other to form cooperating clamp portions. The spring means 37 is preferably an inverted U-shaped leaf spring which is captivated between the flanges to normally urge the feet of the members apart. The exterior surface of one of the members may be provided with a standard tape 30, FIGURE 2, having a pattern thereon comprised of a plurality of colored surfaces which correspond to a certain percentage of sugar content so that a tape being tested may be compared with the standard of the pattern. The confronting interior surfaces of the members may be provided with guide grooves 51 and 52 longitudinally running the length of the member so that in the unlikely event that a droplet of urine passes down from the gripper means it will be guided on the interior surface to the bottom or the support surface.

In use, the holder is utilized to grasp an indicator tape the end of which is dipped into a urine specimen and, thereafter, the holder is simply placed upon a table so that it rests upon the feet and as the urine indicator tape changes color depending upon the sugar contents of the urine specimen, the nurse merely compares it visually with the indicator tape carried on the member.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:
1. An indicator tape holder comprising, a first and second elongate member of equal length, pivot means to connect the members together intermediate the length thereof, spring means on the holder between the members to normally urge one end of each of the members together, and an enlarged footed portion on the other end of each of the members to rest the holder in an upright position with a strip of tape grasped between the said one ends of the members, the confronting sur- faces of the members being provided with a longitudinal drip recess to guide any droplet of water from a piece of tape held in the tape to the footed portion of the members.

2. In a self-supporting clasp for holding a piece of chemically treated indicating tape, first and second substantially identical jaws, each said jaw comprising an essentially flat inner surface and an outer surface tapering from an enlarged flat foot surface intersecting said inner surface, inwardly and upwardly to a reduced upper distal end, first and second essentially identical clasp elements, each said clasp element having a flat base rigidly secured to the inner surface of a respective one of said jaws at the distal end thereof and having its side edges turned inwardly to form pivot flanges, the upper end of each said clasp element projecting upwardly beyond the distal end of its respective jaw, each said projecting end being turned upwardly and inwardly out of the plane of the inner surface of its jaw, to terminate in a clamp portion, the flanges of one said clasp element fitting smoothly between the flanges of the other said clasp element, a pivot pin extending through aligned holes in all said flanges to interpivot said jaws for movement from a first pivotal position wherein said clamp portions are in contact and operable to hold a piece of tape therebetween, to a second position wherein said clamp portions are separated, and spring means between and engaging said inner surfaces adjacent said pivot pin, and urging said jaws into said first position, the flat foot surfaces of said jaws, when in first position, being coplanar in a first plane normal to and intersecting a second plane through said pivot pin and midway between said inner surfaces of said jaws, whereby said clasp is self supporting and will stand erect with a piece of tape held between and extending upwardly from said clamp portions.

3. The clasp of claim 2, said spring means comprising a bowed U-shaped leaf spring having its ends engaging the inner surface of each respective jaw below said pivot pin, and extending upwardly over and about said pivot pin, between said clasp elements.

References Cited by the Examiner

UNITED STATES PATENTS

| D. 11,249 | 6/1879 | Reed | 248—33 X |
|---|---|---|---|
| 515,277 | 2/1894 | Blair | 24—253 |
| 1,260,095 | 3/1918 | Timberlake | 248—33 |
| 1,358,560 | 11/1920 | Kennison | 24—252 |
| 1,400,564 | 12/1921 | Metzger | 248—33 |
| 1,918,933 | 7/1933 | Rogers | 40—125 |
| 2,547,239 | 4/1951 | Walker | 40—13 |
| 2,848,308 | 8/1958 | Free | 23—253 |
| 2,877,582 | 3/1959 | Holland | 40—125 |
| 3,175,553 | 3/1965 | Mattson | 128—2 |

FOREIGN PATENTS

| 186,097 | 6/1907 | Germany. |
|---|---|---|

CLAUDE A. LE ROY, *Primary Examiner.*